Jan. 11, 1966 J. L. ENGLE 3,229,122
SLOW SCAN GENERATOR CIRCUIT
Filed Dec. 28, 1961
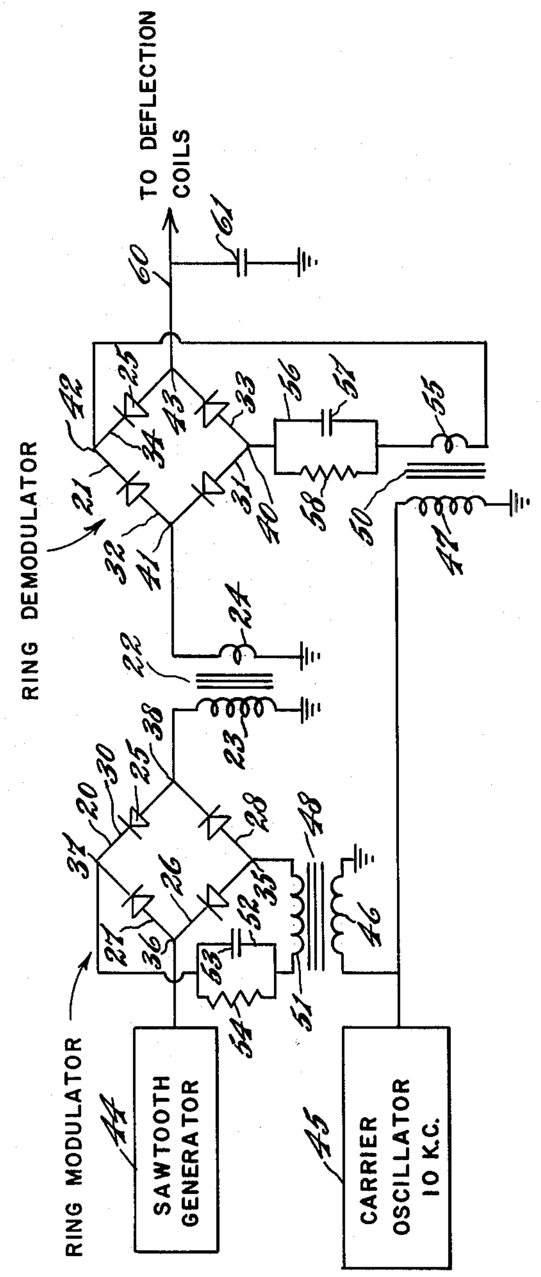
INVENTOR
James L. Engle
BY
ATTORNEYS

United States Patent Office 3,229,122

Patented Jan. 11, 1966

3,229,122

SLOW SCAN GENERATOR CIRCUIT

James L. Engle, New Lisbon, N.J., assignor, by mesne assignments, to the United States of America as represented by the United States Atomic Energy Commission Filed Dec. 28, 1961, Ser. No. 162,665
5 Claims. (Cl. 307—107)

The present invention relates to a slow scan generator which will efficiently supply a slow scan A.C. or a D.C. current wave form to a television deflection yoke.

A purpose of the invention is to provide a slow scan generator which can be connected to a television deflection yoke without requiring special high impedance deflection coil winding.

A further purpose is to supply a slowly varying current to the deflection coil of a picture tube by connecting a control generator such as a sawtooth generator so that it is chopped for example at 10 kc. so that it can pass through an audio step-down transformer and be recovered at a low impedance level by a demodulator and then applied to the deflection coil of a cathode ray oscillograph or picture tube.

A further purpose is to produce a slow scan generator which includes a ring modulator and a ring demodulator coupled to the ring modulator, controlling the ring modulator and the ring demodulator on both sides of the coupling transformer by a carrier oscillator so that both are synchronized.

A further purpose is to provide a capacitor connected to the output of the slow scan generator across to ground to maintain the output voltage between cycles.

A further purpose is to introduce an auxiliary transformer and a circuit loop having a capacitor and an inductor between the carrier oscillator on the one hand and the ring modulator on the other hand. A similar circuit is employed for the ring demodulator.

Further purposes appear in the specification and in the claims.

In the drawings I have chosen to illustrate one only of the numerous embodiments in which the invention may appear, selecting the form shown from the standpoints of convenience in illustration, satisfactory operation and clear demonstration of the principles involved.

The figure is a circuit diagram showing the device of the invention.

Direct connection of the usual vacuum tube type slow scan generator to the deflection coil of a picture tube such as a cathode ray oscillograph presents difficulties. In particular the deflection coils must be of a high impedance to match the impedance of a vacuum tube. A step-down transformer such as is used in fast scanning cannot be directly interposed between the slow scan generator and the deflection coil because this transformer would not pass low frequencies.

The present invention is designed to provide a slow scan generator circuit which will permit connection to the deflection coil of a picture tube without making any adjustments in impedance.

In accordance with the invention a first diode bridge or ring modulator is coupled through an audio step-down transformer with a second diode bridge or ring demodulator. A slowly varying voltage such as a slow scan A.C. voltage wave form, e.g., a sawtooth generator output, is connected to the ring modulator. A carrier oscillator at a suitable frequency, of say 10 kc. and preferably of square wave form, is connected to both the ring modulator and also the ring demodulator so that the two are synchronized. The sawtooth output is then chopped at 10 kc. by the ring modulator so that it can pass through an audio step-down transformer, and it is recovered at a low impedance level by the ring demodulator and then applied to the deflection coil of the picture tube.

Conisdering now the drawing, I illustrate a ring modulator 20 and a ring demodulator 21 coupled together suitably through an audio step-down transformer 22, the opposite side of which is grounded on both the primary 23 and the secondary 24.

Each of the ring modulator and the ring demodulator is a diode bridge containing diodes 25 which are connected in the direction shown, each bridge having four branches 26, 27, 28 and 30 on the ring modulator and 31, 32, 33 and 34 on the ring demodulator. The diodes 25 are suitably silicon junction diodes. The diodes in branches 26, 27, 28, 30, 31, 32, 33 and 34 are connected in the same direction.

On the ring modulator 20 between the branches 26 and 28 there is a terminal 35, between the branches 26 and 27 there is a terminal 36, between the branches 27 and 30 there is a terminal 37 and between the branches 28 and 30 there is a terminal 38.

On the ring demodulator 21, between the branches 31 and 33 there is a terminal 40, between the branches 31 and 32 there is a terminal 41, between the branches 32 and 34 there is a terminal 42 and between the branches 33 and 34 there is a terminal 43.

The anodes of the diodes in the modulator are at the side toward the terminal 35 in branches 26 and 28 and on the side toward the terminal 36 in branch 27 and on the side toward the terminal 38 in branch 25. In the demodulator, the anodes of the diodes are on the side toward the terminal 40 in circuit branches 31 and 33, on the side toward terminal 41 in circuit branch 32 and on the side toward terminal 43 in circuit branch 34.

Input to ring modulator 20 is connected from a control generator typically a sawtooth generator 44 connected to terminal 36. One form of this sawtooth generator could be a phantastron as described in Reference Data for Radio Engineers (4th ed.) 470–471, put out by the International Telephone and Telegraph Corporation. This circuit should be followed by a buffer stage in such a way that the wave form presented to ring modulator 20 will be centered about zero volts. An A.C. coupled power amplifier may be interposed between ring modulator 20 and transformer 22, if required.

The sawtooth generator has a slow scan A.C. voltage wave form of a suitable frequency for controlling the deflection of the slow scan deflection coil of the picture tube yoke. The frequency response of the circuit extends down to D.C. The output of the ring modulator from terminal 38 is connected to one side of the primary 23 of audio step-down coupling transformer 22, the opposite side of which is grounded. The input to the ring demodulator 21 is accomplished from one side of the secondary 24 of the audio step-down transformer 22, which is connected to the terminal 41, the opposite side of the secondary 24 being grounded.

The ring modulator 20 and the ring demodulator 21 are modulated by carrier oscillator 45 of any suitable character well known in the art, at an audio frequency of say 10 kc. A square wave is preferable, such as that produced by a symmetrical multivibrator of sufficient output power.

The carrier oscillator 45 is connected to one side of each of the primaries 46 and 47 of auxiliary audio transformers 48 and 50. The opposite sides of the primaries 46 and 47 are grounded.

The secondary 51 of the transformer 48 is connected at one side to terminal 35 of ring modulator 20 and connected at the other side through circuit loop 52 to terminal 37 of the ring modulator. The circuit loop has opposite branches one of which contains a capacitor 53 and the other of which contains a resistor 54. This combination aids in turning the modulator on and off.

Similarly in the case of the demodulator, auxiliary step down transformer 50 has a secondary 55 which is connected at one end to terminal 42 of the ring demodulator and at the other end is connected to terminal 40 through circuit loop 56 which has opposite branches, one of which contains a capacitor 57 and the other of which contains a resistor 58, to aid in turning the demodulator on and off.

The ring demodulator has an output 60 connected to terminal 43 which extends to one side of the slow scan deflection coil of the television picture tube, the other side of which is grounded. To maintain the voltage on the television deflection coils between cycles, the output 60 of the slow scan generator is connected through a capacitor 61 to ground.

In operation, it will be evident that the device of the invention provides a slow scan generator which can be connected to slow scan deflection coils of a television picture tube without using deflection coils of special high impedance. The device produces a scanning wave which follows that of the control generator 44, which may be a sawtooth generator. Thus the difficulties of direct coupling are avoided.

The carrier oscillator 45 causes the diode bridge or ring modulator 20 and the diode bridge or ring demodulator 21 to open and close at a high audio rate in synchronism with one another. The voltage of the control generator 44 thus alternately appears and disappears at the primary 23 of the coupling transformer 22. This voltage passes through the coupling transformer 22. Then in the ring demodulator circuit the control generator wave is recovered at a low impedance level (for example 50 ohms) which is suitable for connection to match that of the conventional deflection coil of the picture tube.

As the sawtooth wave form appears at the secondary 24 of the coupling transformer 22 it is passed through the second diode bridge or ring demodulator 21 which will be open at the time that the voltage appears on the secondary 24 and thus this voltage passes to the deflection coil of the television picture tube. The capacitor 61 holds the voltage on the deflection coil or coils between cycles.

It will be evident that this circuit has the property of making the output current to the deflection coil follow both positive and negative excusions of the input wave form from the control generator 44.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A slow scan generator for energizing a low impedance deflection coil of a tube, said slow scan generator comprising, a low frequency control generator, a ring modulator having diodes arranged in a ring and having input connection from said low frequency control generator, a ring demodulator having diodes arranged in a ring, a step down transformer coupling the ring modulato with the ring demodulator, said ring demodulator having a low impedance output side adapted to transmit the signal of said control generator to a low impedance deflection coil of a tube, a carrier oscillator operatively connected with both said ring modulator and said ring demodulator to open and close the ring modulator and ring demodulator, and a capacitor operatively connected with said low impedance output side of side ring demodulator for holding voltage between cycles of the signal.

2. A slow scan generator for energizing a low impedance deflection coil of a tube, said slow scan generator comprising, a low frequency control generator, a ring modulator having diodes arranged in a ring and having input connection from said low frequency control generator, a ring demodulator having diodes arranged in a ring, a step down transformer coupling the ring modulator with the ring demodulator, said ring demodulator having a low impedance output side adapted to transmit the signal of said control generator to a low impedance deflection coil of a tube, and a carrier oscillator, there being an auxiliary transformer and a circuit loop having a capacitor and a resistor operatively connected between the carrier oscillator on the one hand, and each of the ring modulator and the ring demodulator to open and close said ring modulator and ring demodulator, said auxiliary transformer connected to the ring demodulator being a step down transformer.

3. A slow scan generator as set forth in claim 2, having a capacitor operatively connected with said low impedance output side of said ring demodulator for holding voltages between cycles of the signal.

4. A slow scan generator for enerigizing a low impedance deflection coil of a tube, said slow scan generator comprising, a low frequency control generator, a ring modulator having diodes arranged in a ring and having input connection from said low frequency control generator, a ring demodulator having diodes arranged in a ring, a step down transformer coupling the ring modulator with the ring demodulator, said ring demodulator having a low impedance output side adapted to transmit the signal of said control generator to a low impedance deflection coil of a tube, and a square wave carrier oscillator operatively connected with both said ring modulator and said ring demodulator to open and close the ring modulator and ring demodulator.

5. A slow scan generator as set forth in claim 4, wherein said low frequency control generator is a sawtooth wave generator.

References Cited by the Examiner

UNITED STATES PATENTS 3,079,568 2/1963 Werth ............... 330—10

ORIS L. RADER, *Primary Examiner.*

LLOYD McCOLLUM, A. SCHWARTZ, J. J. SWARTZ, *Assistant Examiners.*